United States Patent
Matsubara

(10) Patent No.: US 7,327,063 B2
(45) Date of Patent: Feb. 5, 2008

(54) ROTARY ELECTRIC MACHINE FOR VEHICLES

(75) Inventor: Shinichi Matsubara, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/482,168

(22) Filed: Jul. 7, 2006

(65) Prior Publication Data

US 2007/0007843 A1 Jan. 11, 2007

(30) Foreign Application Priority Data

Jul. 7, 2005 (JP) ............................. 2005-198757

(51) Int. Cl.
*H02K 1/00* (2006.01)

(52) U.S. Cl. .................. 310/184; 310/68 D; 310/71

(58) Field of Classification Search ........ 310/201–208, 310/184, 196, 198, 71, 68 D
See application file for complete search history.

(56) References Cited

U.S. PATENT DOCUMENTS

| | | | |
|---|---|---|---|
| 3,774,062 A * | 11/1973 | Johnson | ............ 310/184 |
| 4,315,175 A | 2/1982 | Hamilton et al. | |
| 5,682,070 A | 10/1997 | Adachi et al. | |
| 5,936,326 A | 8/1999 | Umeda et al. | |
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,051,906 A | 4/2000 | Umeda et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,144,136 A | 11/2000 | Umeda et al. | |
| 6,181,043 B1 | 1/2001 | Kusase et al. | |
| 6,181,045 B1 | 1/2001 | Umeda et al. | |

(Continued)

FOREIGN PATENT DOCUMENTS

| | | |
|---|---|---|
| JP | A 51-27405 | 3/1976 |
| JP | A-52-005486 | 1/1977 |
| JP | A 53-005720 | 1/1978 |
| JP | U 05-067165 | 9/1993 |
| JP | A-09-019119 | 1/1997 |
| JP | A-11-191946 | 7/1999 |
| JP | A 2002-078269 | 3/2002 |
| JP | A 2004-266899 | 9/2004 |
| JP | A 2005-278373 | 10/2005 |

OTHER PUBLICATIONS

Japanese Office Action No. 065675, JP-2005-198757, Feb. 20, 2007.

*Primary Examiner*—Dang Le
(74) *Attorney, Agent, or Firm*—Oliff & Berridge, PLC

(57) ABSTRACT

A rotary electric machine, such as a vehicular AC generator, including a rotor rotatably driven; and a stator having a stator iron core disposed to face the rotor and stator windings mounted at the stator iron core, the stator windings being composed of a plurality of electric conductors made from aluminum and copper. For example, the plurality of stator windings are different in materials from each other winding by winding, the materials being either the aluminum or the copper. Alternatively, the plurality of stator windings include windings each being made, part by part, from different materials, the different materials being the aluminum and the copper.

9 Claims, 10 Drawing Sheets

U.S. PATENT DOCUMENTS

| | | | |
|---|---|---|---|
| 6,198,190 B1 * | 3/2001 | Umeda et al. | 310/179 |
| 6,291,918 B1 | 9/2001 | Umeda et al. | |
| 6,459,177 B1 | 10/2002 | Nakamura et al. | |
| 6,459,186 B1 | 10/2002 | Umeda et al. | |
| 6,498,414 B2 | 12/2002 | Asao | |
| 6,741,004 B2 * | 5/2004 | Senoo et al. | 310/215 |

* cited by examiner

40

41

ROTARY ELECTRIC MACHINE FOR VEHICLES

CROSS-REFERENCE TO RELATED APPLICATION

This application is based on and claims the benefit of priority from earlier Japanese Patent Application No. 2005-198757 filed on Jul. 7, 2005, the description of which is incorporated herein by reference.

BACKGROUND OF THE INVENTION

1. Technical Field of the Invention

The present invention relates to rotary electric machines for vehicles, such as automobiles and trucks.

2. Related Art

Segment type coils wound about or embedded in a stator are known well in the art. Such coils wound about or embedded in a stator (hereinafter referred to as "stator windings") typically consist of a number of U-shaped electrical conductors. Segment type stator windings are typically made of copper, however, as disclosed in Japanese Unexamined Patent Application Publication No. 11-191946, windings made of aluminum are also known. Aluminum conductors can provide such merits as reducing weight, and preventing corrosion that may be caused by being in contact with water.

When stator windings are constituted of conductors made from copper, electrical connection has been readily established between the stator windings and a rectifier by connecting copper leads of the stator windings to a terminal of the rectifier, which is also typically made of copper, by using TIG (tungsten inert gas) welding or the like. Since both the leads and the terminal are made of the same material, or copper, solder bonding has also been readily performed. Also, the copper-conductor stator windings have provided good serviceability, such as readily available repair in the market.

On the other hand, when stator windings are constituted of conductors made from aluminum, electrical connection between leads of the stator windings and a terminal of a rectifier is difficult to achieve. This is because aluminum structuring the conductors of the stator windings and copper structuring the terminal of the rectifier are dissimilar metals having different melting points, and thus are not suitable for TIG welding or the like.

From the technical point of view, aluminum and copper can be joined, for example, by ultrasonic welding and friction welding, however, such welding techniques require dedicated equipment. This raises a problem in that assembling of parts cannot be readily carried out in overseas manufacturing bases or in small-scale domestic production lines. Further, since soldering is difficult between the copper conductors of the stator windings and the aluminum terminal of the rectifier, another problem is raised in that serviceability, such as repair in the market and replacement of parts, is considerably deteriorated.

In addition, rotary electric machines mounted on an engine are under extreme vibration conditions. In this regard, when the stator windings including the leads are made of aluminum whose mechanical strength is inherently low, the leads which are run relatively longer distance than other conductors of the stator windings present a problematic deterioration in vibration resistance.

SUMMARY OF THE INVENTION

The present invention has been made in view of the problems described above, and has an object of providing a vehicular rotary electric machine, which facilitates assembling of parts, has good serviceability, and can improve vibration resistance without significantly increasing the cost.

As one aspect of the present invention, there is provided a rotary electric machine comprising a rotor rotatably driven; and a stator having a stator iron core disposed to face the rotor and stator windings mounted at the stator iron core, the stator windings being composed of a plurality of electric conductors made from aluminum and copper. Thus, only the portions confronting strong vibration and requiring vibration resistance, can be constituted of copper conductors, and the other portions can be constituted of aluminum conductors. Thus, the entire vibration resistance of the stator windings can be improved without significantly increasing the cost.

It is preferred that the rotary electric machine comprises a rectifier electrically rectifying an alternating current induced in the stator windings and outputted therefrom, wherein the plurality of stator windings include windings connected to the rectifier and the windings connected to the rectifier is at least made from the copper. Hence, this arrangement enables the use of TIG welding or the like which has been historically used for the connection between stator windings and a rectifier. In other words, owing to the arrangement, assembling of parts in overseas manufacturing bases or in small-scale domestic production lines can be realized. At the same time, owing to the availability of soldering, serviceability in the market can be improved.

It is preferred that the stator iron core has slots formed therein and each of the windings connected to the rectifier has a part embedded in one of the slots. Thus, the leads drawn from the slot of the stator windings and connected to the rectifier can be seamless, whereby the vibration resistance can be further improved in the leads which are unavoidably run for a longer distance than other conductors forming coil ends.

It is still preferred that the stator iron core has slots formed therein and each of the windings connected to the rectifier is disposed outside the slots. Thus, the length of the portion for which the copper conductor is used can be minimized to increase, in turn, the proportion of an aluminum conductor. Accordingly, the effects of reducing weight and preventing corrosion caused by being in contact with water can be improved.

It is also preferred that the plurality of stator windings include windings made from the copper and windings made from the aluminum and a ratio of the windings to the whole stator windings is 3 to 9%. Thus, by reducing the proportion of copper conductors for the entire stator windings, weight reduction and corrosion prevention can be realized while improving feasibility in assembling and serviceability.

Still preferably, the rotary electric machine further comprises cooling fans, wherein the plurality of stator windings includes a plurality of substantially U-shaped segment conductors, wherein each segment conductor has two linear conductor portions embedded in one of slots formed in the stator iron core, a turn conductor portion being integrally formed with the two linear conductor portions and mutually connecting one end portion of each of the two linear conductor portions, and the other end portion of each of the two linear conductor portions, the other end portion of one conductor linear portion being electrically connected with the other end portion of another conductor linear conductor portion so that the other end, and wherein the one end portions and the other end portions of the segment conductors are placed to protrude from the stator iron core to form coil ends in an axial direction of the stator iron core, the cooling fans being located to face the coil ends.

Hence, when the conductor is constituted of a substantially U-shaped conductor segment, replacement of only a portion of the segment from aluminum material to copper material can readily realize the stator windings made from both copper and aluminum.

DETAILED DESCRIPTION OF THE PREFERRED EMBODIMENTS

With reference to the accompanying drawings, hereinafter is described in detail an embodiment of a vehicular AC generator (alternator) to which the vehicular rotary electric machine according to the present invention has been applied.

Figure 1:
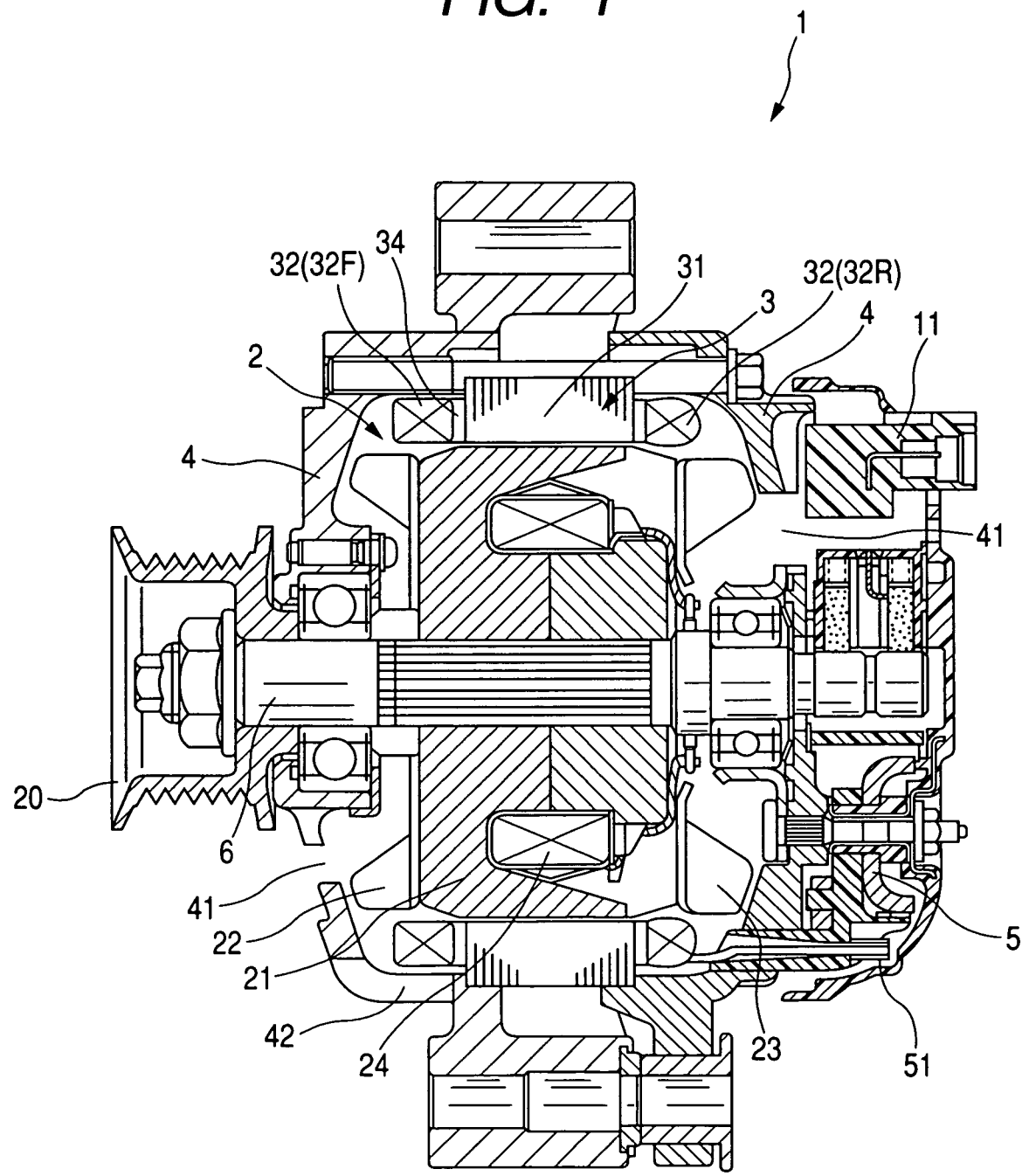
FIG. 1 is a cross section of a vehicular AC generator according to one embodiment of the present invention.

FIG. 1 shows a cross section of a vehicular AC generator 1 according to an embodiment of the present invention. As shown in FIG. 1, the vehicular AC generator 1 of the present embodiment includes a rotor 2, a stator 3, a frame 4, a rectifier 5 and a regulator 11. The vehicular AC generator 1 also includes a pulley 20 for receiving torque from an engine (not shown).

The pulley 20 is fixed to a shaft 6 together with the rotor 2. The rotor 2 is provided with a pair of Lundell type iron cores 21 and a field coil 24, and rotated/driven by the engine. This Lundell type iron cores 21 are provided, at axial end faces thereof, with respective cooling fans 22 and 23. The cooling fans 22 and 23 take cooling air into the inside from an opening 41 provided in the axial direction of the frame 4, and blow out the intake cooling air towards an opening 42 in the radial direction. This cooling air cools, for example, the stator windings 32 of the stator 3, the rectifier 5 connected to the stator windings 32 to rectify AC voltage output from the stator windings 32, and the regulator 11 for regulating the output voltage. The shaft 6 is rotatably supported by the frame 4, with a slip ring being provided in the vicinity of an end portion opposed to the pulley. The stator 3 is fixed to the frame 4 so as to locate at the outer periphery of the rotor 2.

Figure 2:
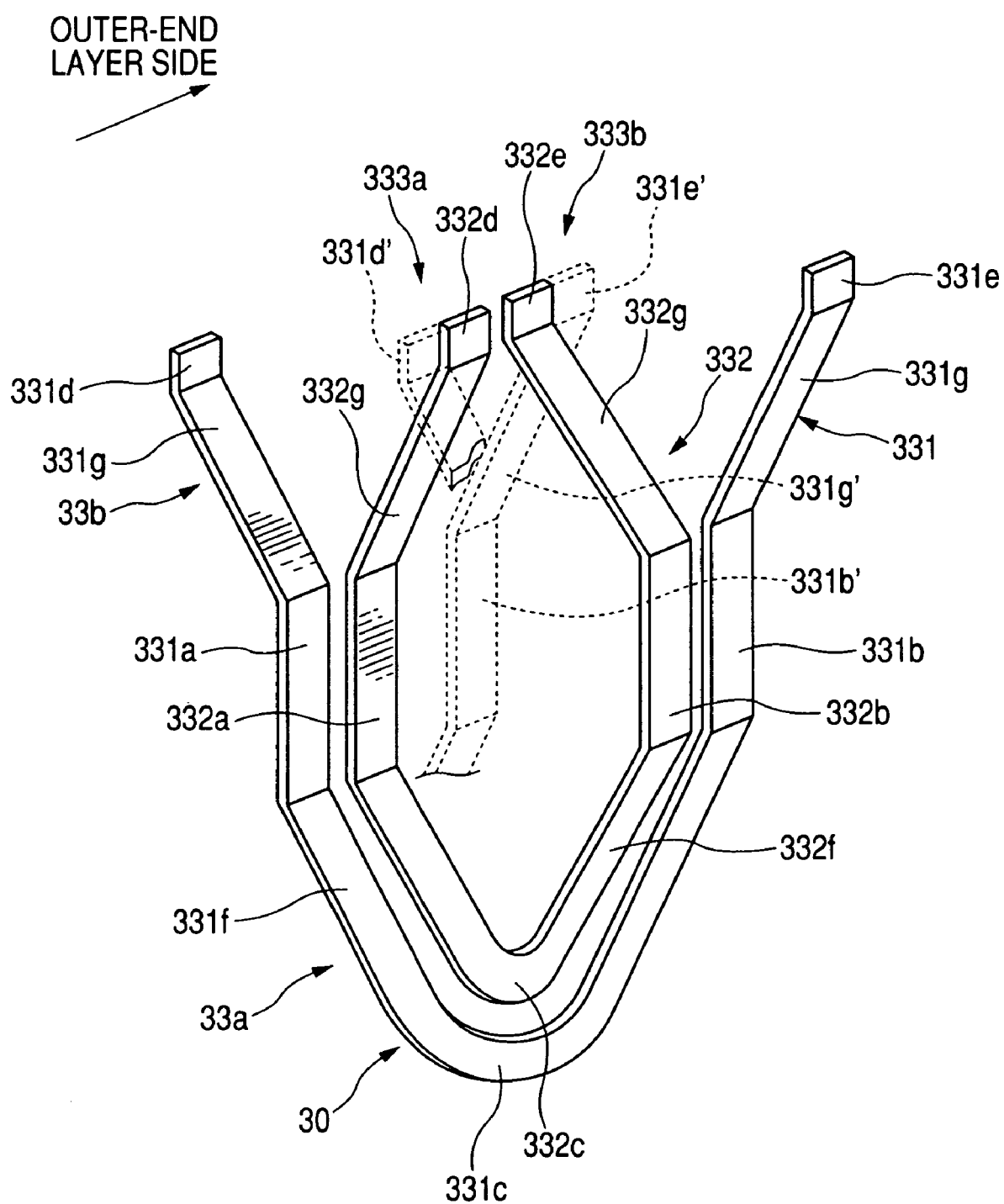
FIG. 2 is a perspective view of two of a plurality of conductor segments constituting stator windings.
Figure 3:
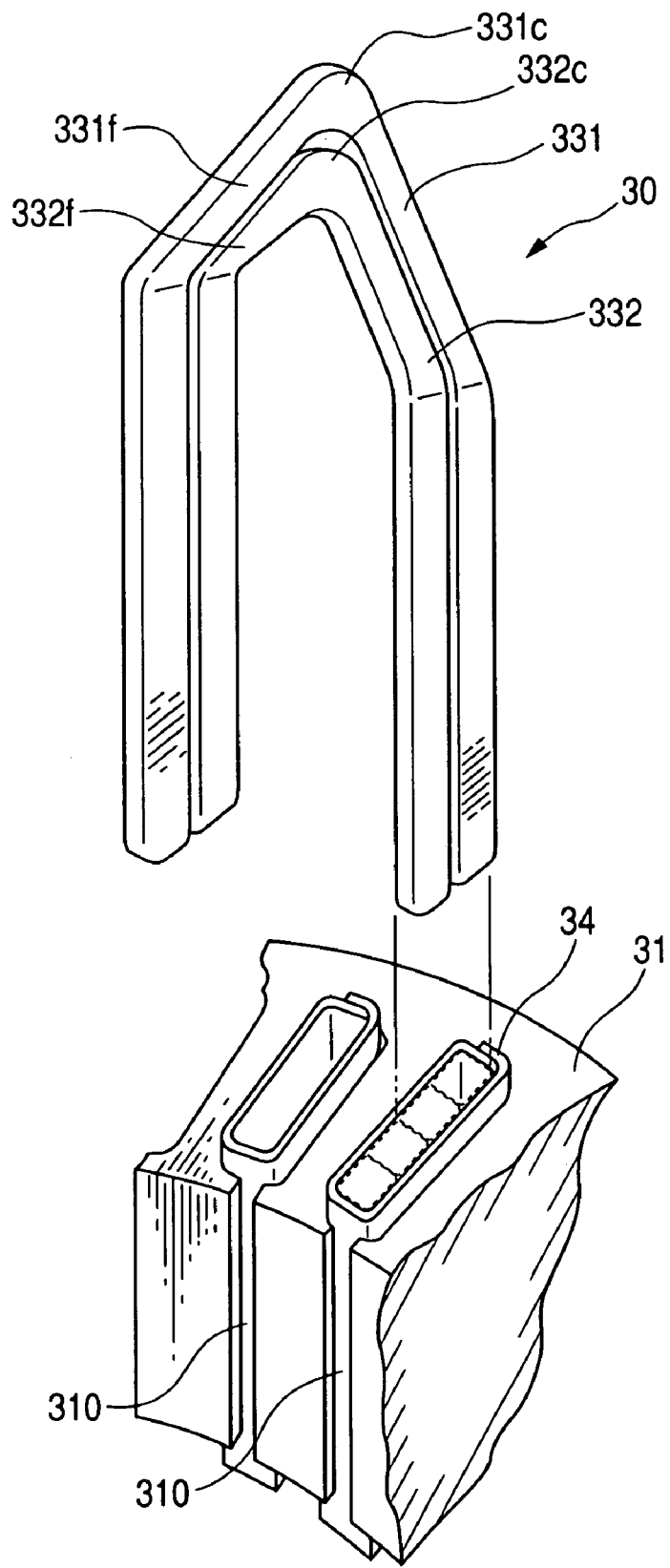
FIG. 3 is a perspective view illustrating the assembling of the conductor segments shown in FIG. 2.

The stator 3 is described in detail below. FIG. 2 is a perspective view showing two of a plurality of conductor segments 30 constituting the stator windings 32 and each having a rectangular cross section perpendicular to its longitudinal direction. FIG. 3 is a perspective view showing the assembling of the conductor segments 30 shown in FIG. 2. The rotor 3 includes the stator windings 32 constituted of the plurality of conductor segments 30 as the conductors, a stator core 31 made of iron in which a plurality of slots 310 (96 slots in the present embodiment, for example) are formed for mounting the stator windings 32, and an insulating sheet 34 sandwiched between the stator windings 32 and the stator core 31. The rotor 2 and the stator 3 are supported by the frame 4.

The stator windings 32 mounted in the slots 310 of the stator core 31 are constituted of a plurality of electric conductors. Even numbers (4 in the present embodiment, for example) of electric conductors are accommodated in each of the slots 310. Each of these electric conductors has substantially a rectangular cross section perpendicular to its longitudinal direction. As shown in FIG. 3, the four electric conductors are arranged in a row along the radial direction of the stator core 31 in the order of an inner end layer, an inner middle layer, an outer middle layer and an outer end layer from the inside to the outside.

The inner end layer, or an electric conductor (linear conductor portion) 331a, in one slot 310 makes a pair with the outer end layer, or a electric conductor 331b in another slot 310 which is one pole pitch distanced in clockwise direction of the stator core 31 as viewed from the axial direction. Similarly, the inner middle layer, or an electric conductor 332a in one slot 310, makes a pair with the outer middle layer, or an electric conductor 332b in another slot 310 which is one pole pitch distanced in clockwise direction of the stator core 31 as viewed from the axial direction. The pair of electric conductors 331a and 331b, and the pair of electric conductors 332a and 332b are connected, on one axial end face of the stator core 31, via a U-turn portion (turn conductor portion) 331c and a U-turn portion 332c, respectively.

Thus, on one axial end face of the stator core 31, a serial line in which the electric conductors 332a and 332b are connected via the U-turn portion 332c is lapped by a serial line in which the electric conductors 331a and 331b are connected via the U-turn portion 331c. In other words, on one end face of the stator core 31, the U-turn portion 332c serving as a connector between the paired electric conductors 332a and 332b in one slot 310, is surrounded by the U-turn portion 331c serving as a connector between the paired electric conductors 331a and 331b which are accommodated in the same slot 310. In this way, a middle layer coil end is formed by connecting the outer middle layer, or the electric conductor 332b to the inner middle layer, or the electric conductor 332a. Similarly, an end layer coil end is formed by connecting the outer end layer, or the electric conductor 331b to the inner end layer, or the electric conductor 331a.

On the other hand, the inner middle layer, or the electric conductor 332a in one slot 310 also makes a pair with an inner end layer, or a electric conductor 331a' in another slot 310 which is one pole pitch distanced in clockwise direction of the stator core 31 as viewed from the axial direction. Similarly, an outer end layer, or a conductor ember 331b' in one slot 310 also makes a pair with the outer middle layer, or the electric conductor 332b in another slot 310 which is one pole pitch distanced in clockwise direction of the stator core 31 as viewed from the axial direction. These pairs are each connected on the other axial end face of the stator core 31.

On the other end face of the stator core 31, therefore, an outer connected portion 333b connecting the outer end layer, or the electric conductor 331b' to the outer middle layer, or the electric conductor 332b, and an inner connected portion 333a connecting the inner end layer, or the electric conductor 331a' to the inner middle layer, or the electric conductor 332a, are disposed being offset from each other in the radial and circumferential directions. By connecting the outer-end electric conductor 331b' to the outer-middle electric conductor 332b, and by connecting the inner-end electric conductor 331a' to the inner-middle electric conductor 332a, two adjacent-layer coil ends each located at different concentric circles are formed.

As shown in FIG. 2, the inner-end electric conductor 331a and the outer-end electric conductor 331b are provided by a large segment 331 in which a series of conductors are molded so as to substantially have a shape of "U". The inner-middle electric conductor 332a and the outer-middle electric conductor 332b are provided by a small segment 332 in which a series of conductors are molded so as to substantially have a shape of "U". The basic U-shaped conductor segments 30 are thus formed of the large segment 331 and the small segment 332. The segments 331 and 332 are provided with portions which are accommodated in the slots 310 and extend along the axial direction, and are provided with oblique portions 331f, 331g, and 332f, 332g, respectively, which extend being inclined at a certain angle with respect to the axial direction. These oblique portions form a rear side coil end group 32R and a front side coil end group 32F projecting from the respective axial end faces of the stator core 31. Ventilation paths for the cooling air produced by the turning of the cooling fans 22 and 23 are thus principally formed between these oblique portions at the respective end faces. Leads of the stator windings 32 are also arranged in the ventilation paths for the cooling air.

The arrangement described above is applied to the conductor segments 30 inserted into all the slots 310. On the side opposed to the U-turn portions, i.e. on the side of the front coil end group 32F, an outer-end layer end portion 331e' is bonded to an outer-middle layer end portion 332e, and an inner-middle layer end portion 332d is bonded to an inner-end layer end portion 331d' using, for example, TIG welding and ultrasonic welding to form the outer connected portion 333b and the inner connected portion 333a, respectively, thereby achieving electrical connection.

Figure 4:
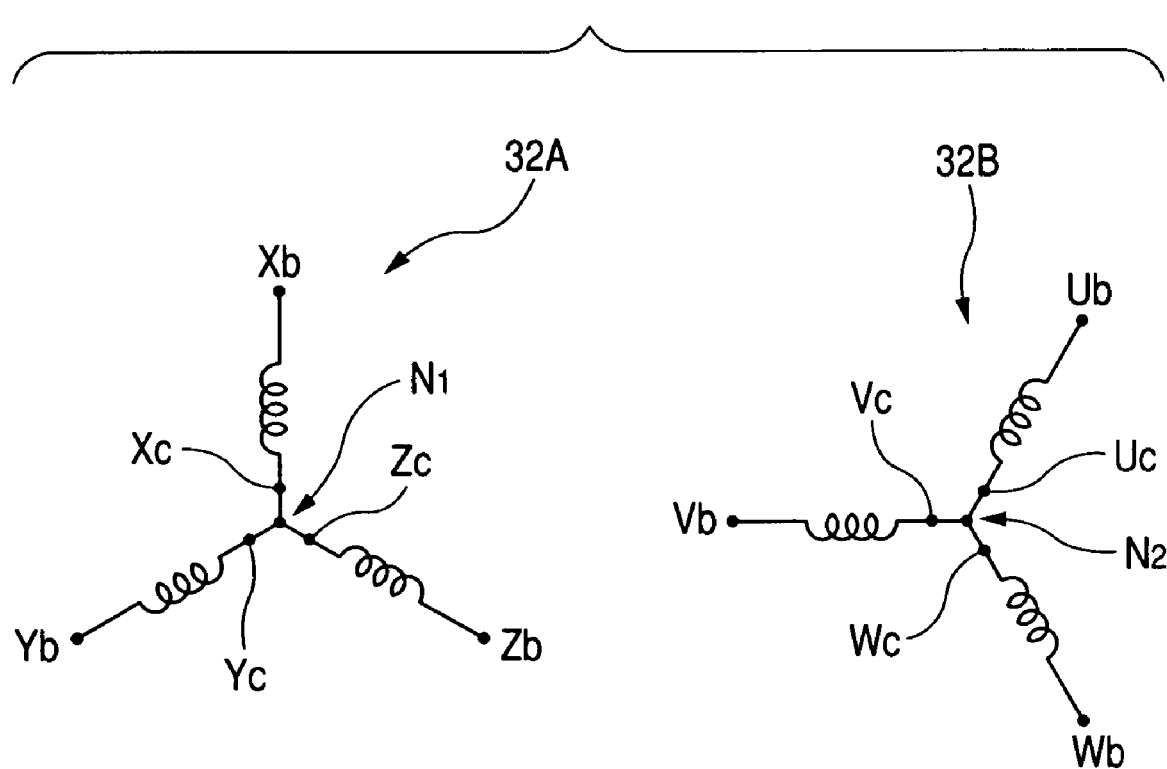
FIG. 4 is an explanatory view of the stator windings of an embodiment other than the present embodiment.

In the present embodiment, two types of three-phase windings 32A and 32B are formed as shown in FIG. 4 by using the conductor segments 30 described above. The stator windings 32 are constituted of these three-phase windings 32A and 32B. Y connection is provided to each of the three-phase windings 32A and 32B with the phase being offset from each other by 30 degrees by electrical angle.

Figure 5:
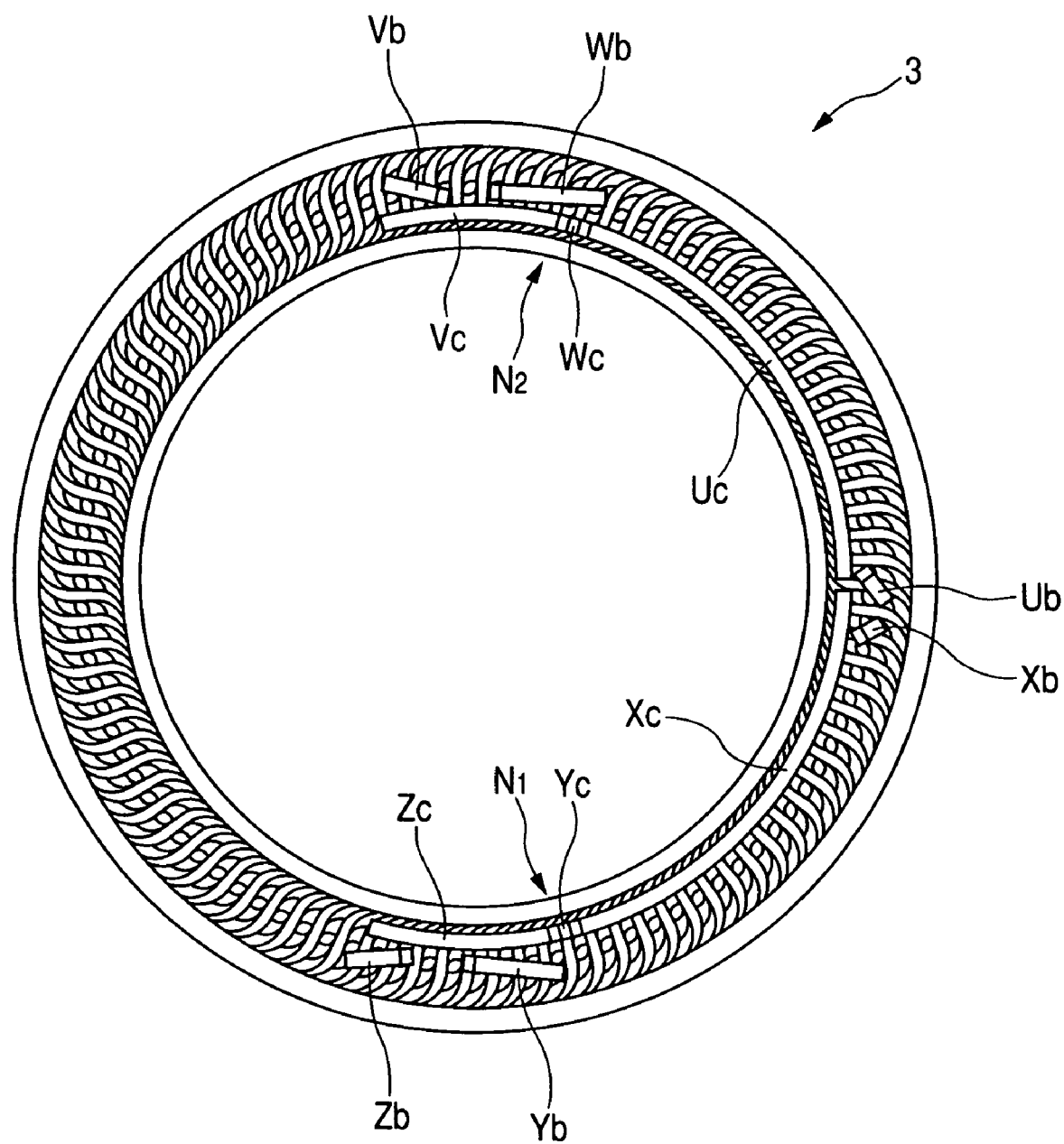
FIG. 5 is an illustration showing the locations of leads and neutral points of two types of three-phase windings constituting the stator windings.

FIG. 5 shows the locations of leads and neutral points of the two types of the three-phase windings 32A and 32B structuring the stator windings 32. In FIG. 5, Xb, Yb and Zb indicate three leads, and N1 indicates a neutral point of one three-phase winding 32A, and Ub, Vb and Wb indicate three leads and N2 indicates a neutral point of the other three-phase winding 32B. These leads Xb, Yb, Zb, Ub, Vb and Wb, and the neutral points N1 and N2 are arranged on the side of the rear coil end group 32R. The leads Xb, Yb, Zb, Ub, Vb and Wb are bonded to a copper terminal 51 of the rectifier 5.

Figure 6:
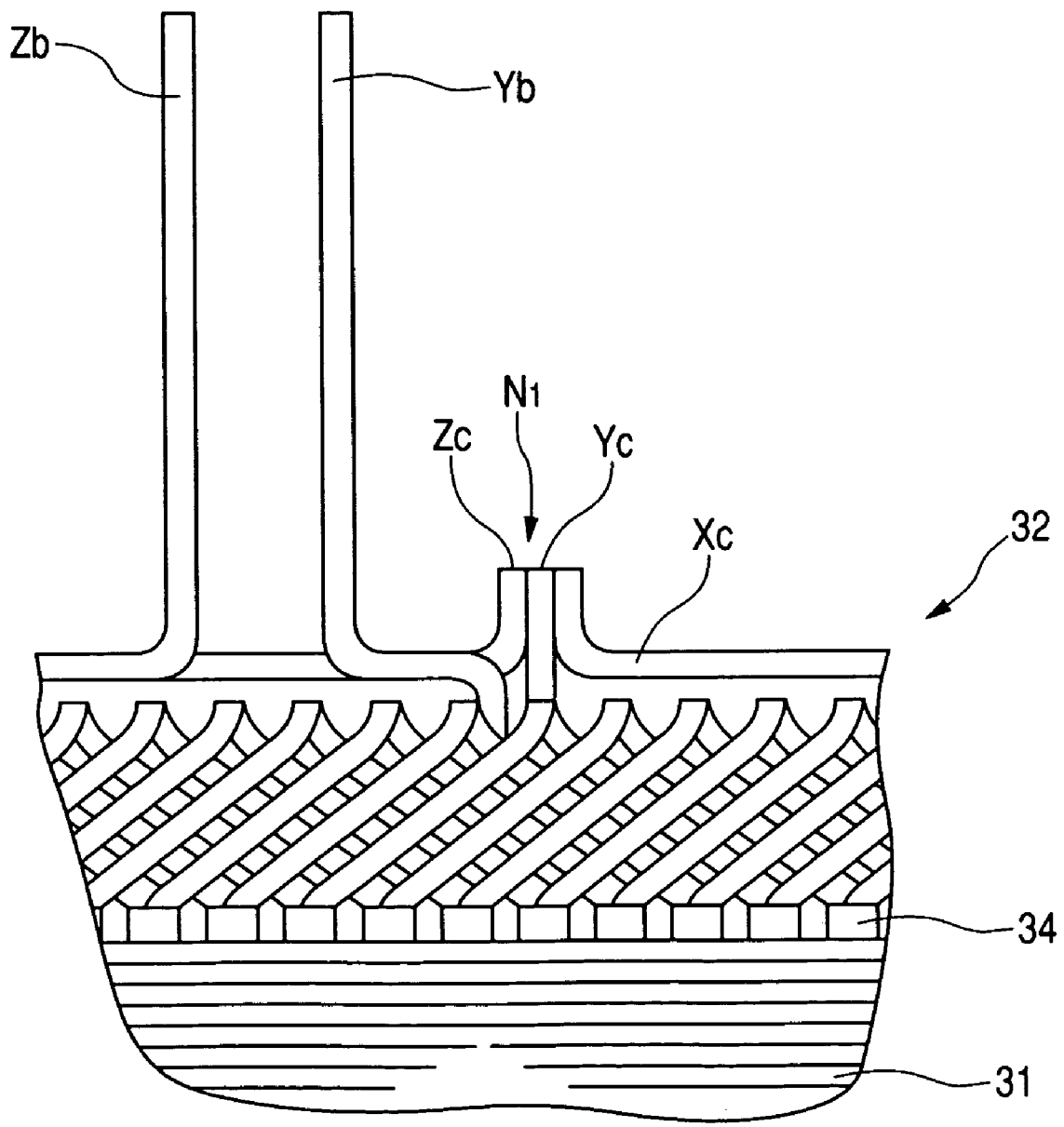
FIG. 6 is an illustration showing in detail the shapes of the leads and the neutral points corresponding to the three-phase windings.
Figure 7:
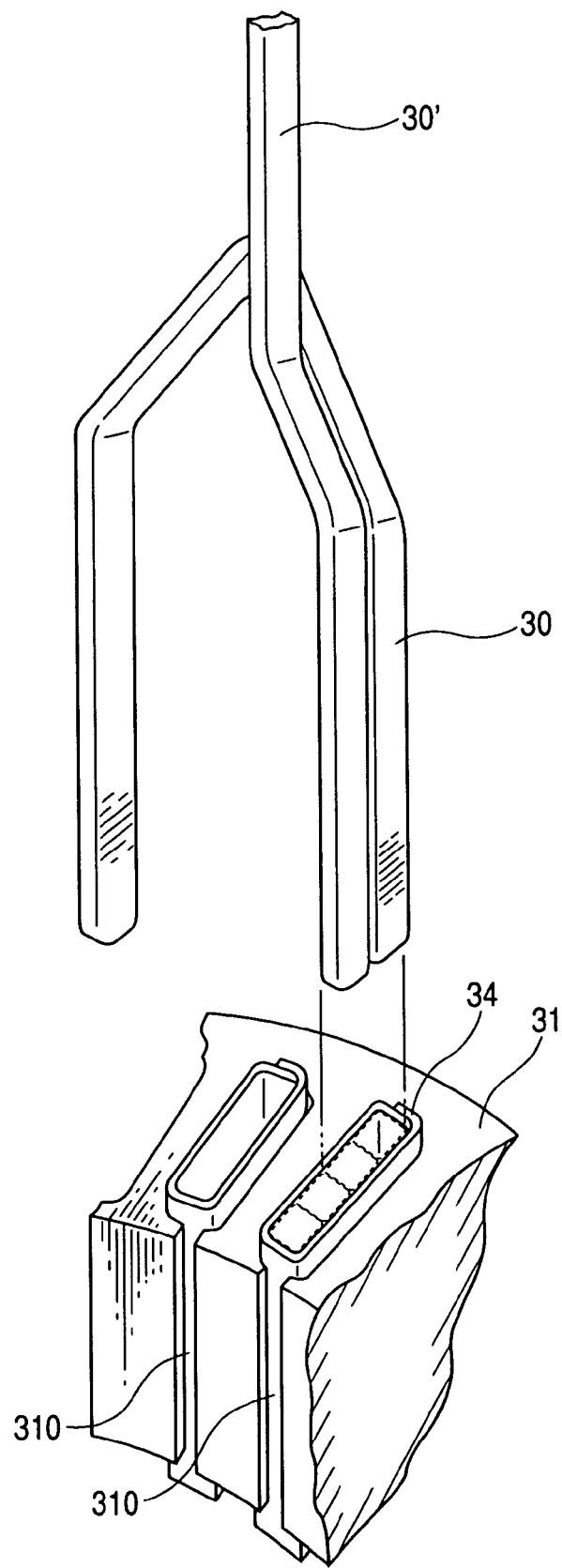
FIG. 7 is a perspective view illustrating the assembling of a conductor segments used as the lead and the neutral point.

FIG. 6 shows detailed shapes of the leads Yb and Zb, and the neutral point N1 of the three-phase winding 32A. FIG. 7 is a perspective view showing assembling of conductor segments used as the leads and the neutral point. As shown in FIG. 7, the leads and the like projected from the side of the rear coil end group 32R are formed by using linear conductor segments 30' having no U-turn portion. Each conductor segment 30' has a shape in which a portion corresponding to the U-turn portion of the conductor segment 30 is extended straight without being bent, not forming an arc. Thus, as shown in FIG. 7, by inserting the conductor segment 30' into the slot 310 of the stator core 31 together with the conductor segment 30, and by bending an end portion of the conductor segment 30', the end portion of the conductor segment 30' can be bonded to an end of other conductor segment 30. In this manner, the lead Xb or the like can be readily formed.

In the present embodiment, the conductor segments 30' corresponding to the six leads Xb, Yb, Zb, Ub, Vb and Wb are made of copper (copper-made leads; that is, copper-made conductor segments), and six conductor segments 30' corresponding to some of the U-shaped conductor segments 30 and the neutral points are made of aluminum. Further, the number of the slots 310 is set to ninety-six, with about 3.1% (=6 leads/{96 slots×(4 layers/2)}) in the number of the conductor segments being copper conductor segments 30', for example.

As described above, in the vehicular AC generator 1 of the present embodiment, a portion of the conductor segments 30' in the stator windings 32 are made of copper, and other conductor segments 30', the conductor segments 30 or the like are made of aluminum. Specifically, only the portions having strong vibrations and thus requiring vibration resistance can use the conductor segments 30' made of copper, and the other portions can use the conductor segments 30 made of aluminum. Accordingly, vibration resistance of the entire stator windings 32 can be improved without having to raise the cost considerably.

In particular, use f copper for at least the conductor segments 30' serving as the leads to be connected to the rectifier 5, enables the use of the conventionally used TIG welding or the like, by which assembling in oversea manufacturing bases or in small-scale domestic production lines is also enabled. In addition, availability of soldering enables disconnection and reconnection between the stator windings 32 and the rectifier 5, and thus enables replacement of parts in the market, whereby serviceability in the market can be improved.

Note that, inside the stator windings 32, some bonding has to be made between the copper conductor segments 30' and the aluminum conductor segments 30, however, such boding can be carried out by using the ultrasonic welding and solid solution welding, for example, with dedicated equipment. Considering the stator 3 as a whole, such an arrangement described above is complicated comparing with stators having copper conductor segments alone, or aluminum conductor segments alone.

However, since such stators as the stator 3 using the conductor segments 30 shown in FIG. 2 originally have a complicated arrangement, it results that they are manufactured in large factories. Accordingly, bonding between the aluminum conductor segments and the copper conductor segments can anyway be performed in such large factories. Therefore, oversea manufacturing bases or small-scale domestic production lines only have to assemble the stators, such as the stator 3, which have been manufactured in the large factories, by bonding the copper conductor segments to rectifiers, thereby ensuring good assembling properties. In the market, repairing a bonding portion between conductor segments cannot actually occur (such necessity may arise when disconnection occurs in the stator windings, but in such a case, the entire stator 3 is to be changed). In other words, the same level of serviceability can be provided as in the case where all the conductor segments are made of copper.

The conductor segment 30 serving as the lead to be connected to the rectifier 5 is partially arranged in the slot 310 formed in the stator core 31. This arrangement allows elimination of joints from the lead which is drawn out of the slot 310 and connected to the rectifier 5. As a result, vibration resistance of the conductor segment 30 used as a lead which is longer than other conductors forming coil ends, can be improved further.

As described above, the stator 3 employs the substantially U-shaped conductor segments 30, with the end portions of different conductor segments being bonded to form the stator windings 32. In this arrangement, if only a portion of the aluminum conductor segments is changed to copper conductor segments, conductors of the stator windings can be readily constituted with copper and aluminum.

In the present embodiment, as described above, the conductor segments (i.e., leads) occupying some 3.1% of all the conductor segments are made of copper (=6 leads/{96 slots×(4 layers/2)}), while the remaining conductor segments are made of aluminum. This ratio of the copper-made conductor segments, however, is just an example. One typical vehicular AC generator adopts 12 leads, 92 slots, and 4 layers per slot, so that the number of copper-made conductor segments corresponds to some 6.3% of all the segment conductors (=12 leads/{96 slots×(4 layers/2)}). Another typical vehicular AC generator adopts 6 leads, 72 slots, and 4 layers per slot, so that the number of copper-made conductor segments corresponds to some 4.2% of all the segment conductors (=6 leads/{72 slots×(4 layers/2)}). Still typical vehicular AC generator adopts 12 leads, 72 slots, and 4 layers per slot, so that the number of copper-made conductor segments corresponds to some 8.3% of all the segment conductors (=12 leads/{72 slots×(4 layers/2)}). From these figures, it can be said that typical ratios of the number of copper-made conductor segments to all the conductor segments exist within a range of ratios from 3 to 9%.

It should be appreciated that the present invention is not limited to the embodiment provided above, and that various modifications may be made without departing from the spirit and the scope of the claims of the present invention. In the above embodiment, only the conductor segments serving as the leads for the stator windings 32 have been made of copper, and other conductor segments have been made of aluminum, however, the number of the conductor segments made of copper may be increased. For example, the conductor segments 30' forming the neutral points N1 and N2, as well as some of the U-shaped conductor segments 30 directly connected to the leads, may be made of copper. Where the proportion of the number of copper conductor segments is 3% to 9% as described, sufficient effects of using aluminum conductor segments 30 can be expected, the effects including reduction of weight or prevention of corrosion that may be caused by being in contact with water.

Figure 8:
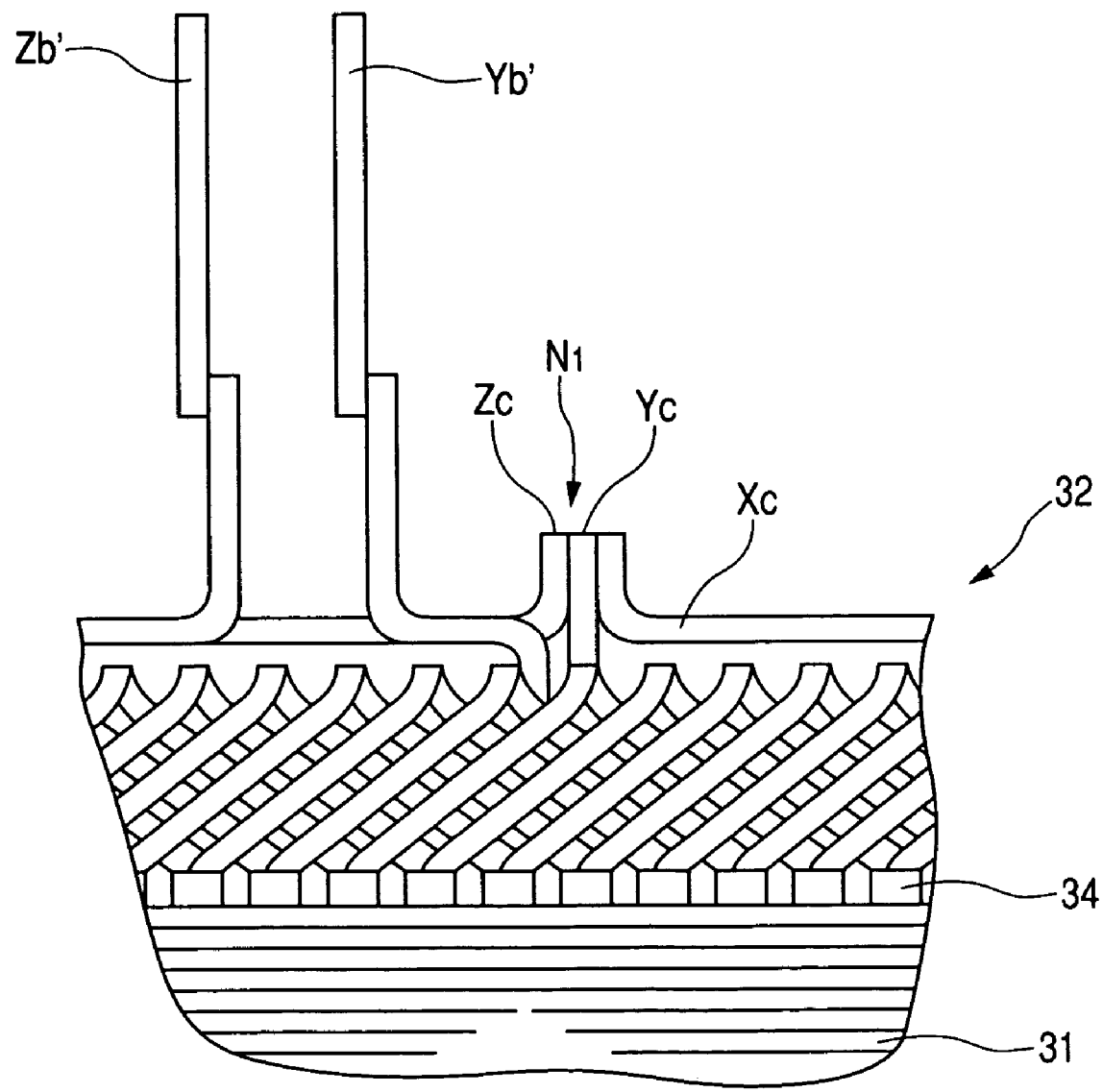
FIG. 8 is an illustration showing a modification of the leads.

In the present embodiment, the entire conductor segment 30' shown in FIG. 7 has been made of copper, however, as shown in FIG. 8, the portion accommodated in the slot 310 may be made of aluminum and only the portion projecting from the slot 310 for connection with the rectifier 5 (e.g., the leads Yb' and Zb') may be made of copper, with the both being joined by welding. Use of such an arrangement can still improve the assembling properties between the terminal 51 of the rectifier 5 and the leads Yb' and Zb' to thereby improve serviceability in the market. This arrangement can minimize the portions of employing copper conductors, so that the proportion of aluminum conductors can be increased to achieve reduction of weight or prevention of corrosion that may be caused by being in contact with water.

Figure 9:
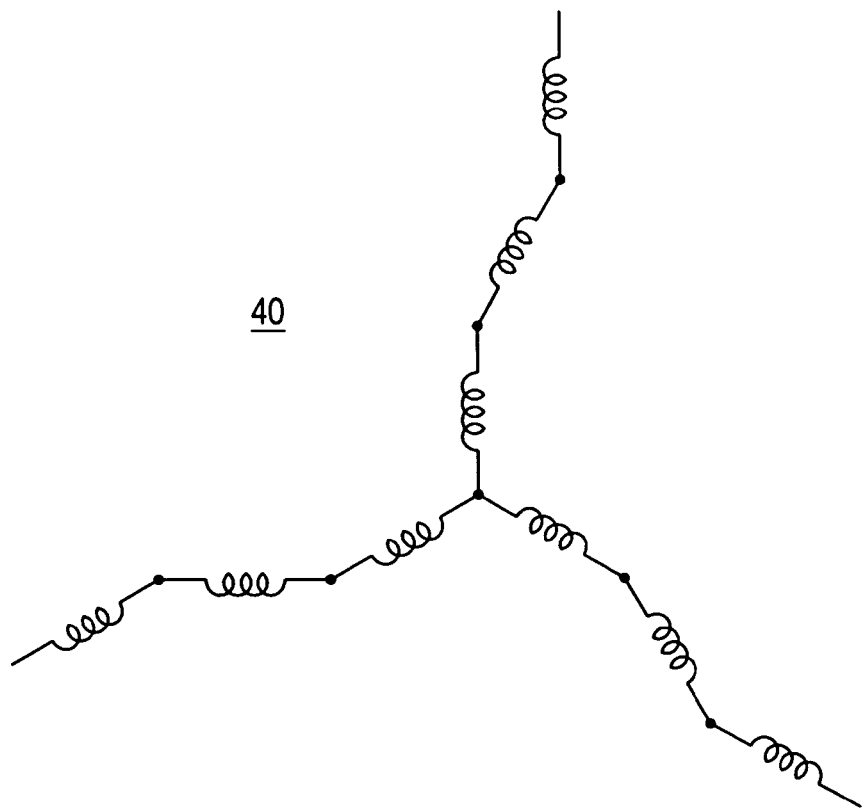
FIG. 9 is an illustration showing a modification of the stator windings.
Figure 10:
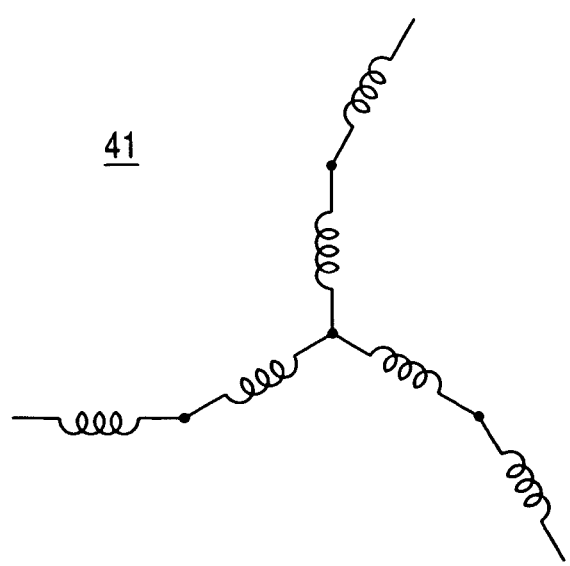
FIG. 10 is an illustration showing a modification of the stator windings.
Figure 11:
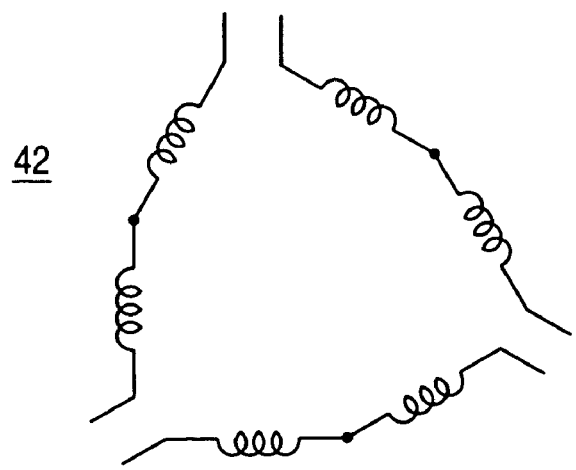
FIG. 11 is an illustration showing a modification of the stator windings.
Figure 12:
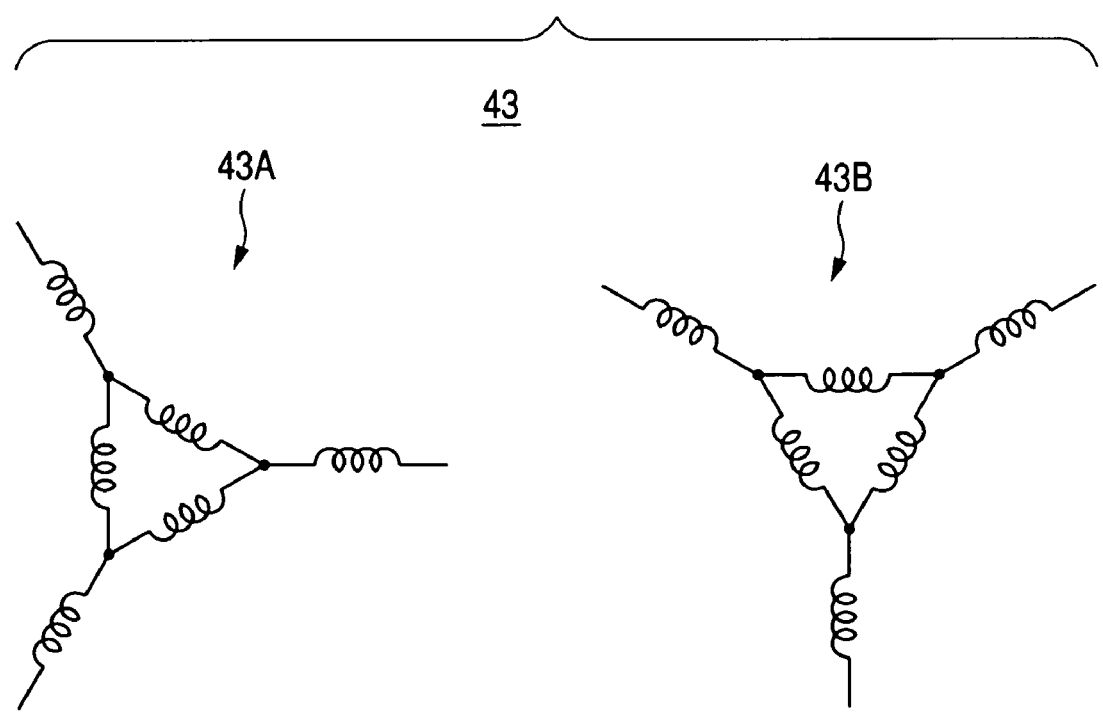
FIG. 12 is an illustration showing modifications of the stator windings.

In the embodiment described above, the stator windings 32 have been arranged by combining two types of three-phase windings 32A and 32B as shown in FIG. 4, however, the stator windings 32 may be arranged by using one type of three-phase winding. Alternatively, as shown in FIGS. 9 and 10, the present invention can be applied to zigzag-connected windings 40 and 41 in which two types of Y (star) connections are connected in series, respectively. Alternatively, the present invention can be applied to stator windings 42 in which a Δ (delta) connection and a zigzag connection are combined as shown in FIG. 11, or to stator windings 43 consisting of two types of three-phase windings 43A and 43B in each of which a Δ connection and a Y connection are combined, as shown in FIG. 12.

By the way, the present invention will not be limited to the application to four-wheeled vehicles described above, but applicable to any rotary electric machines mounted in two-wheeled vehicles, marine vessels, aircraft, and any others running bodies which need a rotary electric machine with the stator and rotator.

Further, the copper and aluminum employed as the materials of the stator windings can contain a certain degree of impurities, as long as an electrical conductivity sufficient for the generator is kept.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A multiple-phase rotary electric machine comprising:
   a rotor rotatably driven;
   a stator having a stator iron core extending in an axial direction thereof, having slots formed therein in the axial direction, and being disposed to face the rotor and, phase by phase, a stator winding mounted through the slots of the stator iron core, the stator winding being formed to have a substantial rectangular section in a direction perpendicular to a length direction of the stator winding and composed of, phase by phase, a plurality of electric conductors made of, conductor by conductor, aluminum and copper, the electric conductors including a single copper-made electric conductor serving as a lead for each phase; and
   a rectifier to have copper-made terminals and to rectify an alternating current output from the stator winding, the single copper-made electric conductor for each phase being directly connected to each of the copper-made terminals and disposed outside the slot of the stator iron core.

2. The multiple-phase rotary electric machine according to claim 1, wherein the slot of the stator iron core has slots formed therein and each of the electric conductors for each phase connected to the rectifier has a part embedded in one of the slots.

3. The multiple-phase rotary electric machine according to claim 1, wherein the plurality of electrical conductors for multiple phases include conductors made of the copper and the aluminum and the conductors made of the copper to the electric conductors of the whole stator is 3 to 9% in ratio of the number of electric conductors, the remaining conductors other than the copper-made conductors being made of the aluminum.

4. The multiple-phase rotary electric machine according to claim 1, further comprising cooling fans rotated together with the rotor,
   wherein the plurality of electric windings for each phase include a plurality of substantially U-shaped segment conductors,
   wherein each segment conductor has two linear conductor portions formed to have both ends and is embedded in given slots of the slots of the stator iron core and a turn conductor portion being integrally formed with the two linear conductor portions to mutually connect respective one ends of the two linear conductor portions so that each substantially U-shaped segment conductor is formed, the plurality of substantially U-shaped segment conductors being connected to each other by mutually connecting the other ends of every two substantially U-shaped segment conductors among the plurality of substantially U-shaped segment conductors, and
   wherein the one ends and the other ends of the segment conductors are placed to protrude from the stator iron core to form coil ends in the axial direction of the stator iron core, the cooling fans being located to face the coil ends.

5. The multiple-phase rotary electric machine according to claim 1, further comprising a frame supporting both the rotor and the stator.

6. The multiple-phase rotary electric machine according to claim 1, which is mounted on a vehicle and the rotor is rotatably driven by the vehicle.

7. A multiple-phase rotary electric machine comprising:
   a rotor rotatably driven;
   a stator having a stator iron core extending in an axial direction thereof, having slots formed therein in the axial direction, and being disposed to face the rotor and, phase by phase, a stator winding mounted through the slots of the stator iron core, the stator winding composed of, phase by phase, a plurality of electric conductors made of, conductor by conductor, aluminum and copper, the electric conductors including a single copper-made electrical conductor serving as a lead for each phase; and
   a rectifier formed to have copper-made terminals and to rectify an alternating current output from the stator winding, the single copper-made electric conductor for each phase being directly connected to each of the copper-made terminals.

8. A multiple-phase rotary electric machine comprising:
   a rotor rotatably driven
   a stator having a stator iron core extending in an axial direction thereof, having slots formed therein in the axial direction, and being disposed to face the rotor and, phase by phase, a stator winding mounted through the slots of the stator iron core, the stator winding composed of, phase by phase, a plurality of electric conductors made of, conductor by conductor, aluminum and copper, the electric conductors including a single copper-made electric conductor serving as a lead for each phase; and
   a rectifier formed to have copper-made terminals and to rectify an alternating current output from the stator winding, the single copper-made electric conductor for each phase being directly connected to each of the copper-made terminals and disposed outside the slot of the stator iron core.

9. A multiple-phase rotary electric machine comprising:
   a rotor rotatably driven;
   a stator having a stator iron core extending in an axial direction thereof, having slots formed therein in the axial direction, and being disposed to face the rotor and, phase by phase, a stator winding mounted through the slots of the stator iron core, the stator winding composed of, phase by phase, a plurality of electric conductors made of, conductor by conductor, aluminum and copper, the electric conductors including a single copper-made electric conductor serving as a lead for each phase; and
   a rectifier formed to have copper-made terminals and to rectify an alternating current output from the stator winding, the single copper-made electric conductor for each phase being directly connected to each of the copper-made terminals,
   wherein the plurality of electric conductors for multiple phases include conductors made of the copper and the aluminum and the conductors made of the copper to the electric conductors of the whole stators is 3 to 9% in ratio of the number of electric conductors, the remaining conductors other than the copper-made electric conductors made of the aluminum.

* * * * *